(12) United States Patent
Lee

(10) Patent No.: US 6,286,175 B1
(45) Date of Patent: Sep. 11, 2001

(54) WINDSHIELD WIPER PROTECTOR

(76) Inventor: Yuan-Chiang Lee, No. 25, Lane 267, Ta-Tung N. Rd., Shan-Chung City (TW)

( * ) Notice: Subject to any disclaimer, the term of this patent is extended or adjusted under 35 U.S.C. 154(b) by 0 days.

(21) Appl. No.: 09/533,992

(22) Filed: Mar. 24, 2000

(51) Int. Cl.[7] ....................................................... B60S 1/32

(52) U.S. Cl. ...................................... 15/250.19; 15/250.01

(58) Field of Search ........................... 15/250.19, 250.01, 15/250.351, 250.16

(56) References Cited

U.S. PATENT DOCUMENTS 5,571,221 * 11/1996 Kuo et al. .......................... 15/250.19

FOREIGN PATENT DOCUMENTS

3325707 * 1/1985 (DE) ................................. 15/250.19

* cited by examiner

*Primary Examiner*—Gary K. Graham
(74) *Attorney, Agent, or Firm*—Raymond Y. Chan; David and Raymond Patent Group

(57) ABSTRACT

Disclosed herein is an innovated windshield wiper protector for an automobile. It comprises a pressurized fluid container, in which a plunger, a solenoid operated device, a pressurized fluid chamber, a spring, and a push bar with an adjustable screw are provided. By energizing or de-energizing the solenoid operated device, the plunger may reciprocate in the pressurized fluid container so as to vary the fluid pressure in the pressurized fluid chamber that causes the push bar to retract into or extend out of the chamber with the result that the wiper is made closely in contact with windshield glass, or the wiper is separated from the windshield glass with a clearance therebetween.

2 Claims, 4 Drawing Sheets

WINDSHIELD WIPER PROTECTOR

BACKGROUND OF THE INVENTION

1. Field of the Invention

The present invention relates to windshield wiper protector, and more particularly, to a windshield wiper protector which is operative by self control.

2. Description of the Prior Art

A clear visibility is an important factor to assure secure driving for a driver so that quality of an automobile windshield wiper becomes negligible. Under the worst environmental condition, no matter how good or how firmly constructed a wiper is, it is definitely destined to be replaced within half year. According to observation and experiments of the inventor of the present invention, a conventional windshield wiper has the following common shortcomings:

1. At the extremely hot summer season, a wiper will be softened and deteriorated by contacting with a windshield glass at high temperature.

2. At the extremely cold winter season, a wiper will be hardened and deteriorated by frost, snow, and ice stuck on the surface of a windshield glass where a wiper contact with.

3. A wiper will be abrased or cracked when wiping through the surface of a windshield glass which is contaminated by dusts, or oil stains caused by vehicle exhaust gas.

4. An elastic fatigue caused by a long term continuous wiping action results in hardening and deterioration of a wiper.

To eliminate the above mentioned shortcomings, there has been disclosed a device by the name of "wiper holding down plate " which utilizes a wind pressure produced by the wind flow velocity to achieve the purpose of removing oil stains stuck on the windshield glass. By so, it can only solve a part of existing problems, but after several times of application, old problems will re-occur.

A conventional windshield wiper protector characterized by including a clip and an urging bar has a main shortcoming that it is so inconvenient to be applicable only by manual control. Especially when encountering a sudden rainfall, the driver will be quite embarrassed by being unable to response. This device is effective only in the case that the automobile is to be parked for a long time. Naturally, it is not a satisfactory device.

In order to overcome the shortcomings inherent to the conventional technique described above, the present inventor has delved into this matter with a long time efforts and came to realization of an improved windshield wiper protector of the present invention.

SUMMARY OF THE INVENTION

Accordingly, it is an object of the present invention to provide a windshield wiper protector for an automobile which can facilitate the driver securely and comfortably drive in the night time or during rainy days.

It is another object of the present invention to provide a windshield wiper protector for an automobile which can be used to protect the windshield wiper from abrasing a windshield glass during its operation.

To achieve these and other objects, gist of the present invention is directed to provide a windshield wiper protector comprising a pressurized fluid container, a plunger installed in the pressurized fluid container, a solenoid operated device provided at one side of the plunger in the pressurized fluid container, a coil spring being connected to the plunger at the same side of the solenoid operated device, while the other side of the plunger is adjacent to a pressurized fluid chamber, a push bar connected to the plunger at the opposite side of the pressurized fluid chamber, an adjustable screw combined to an extended end of the push bar such that the adjustable screw is able to extend or retract, a fixing nut for screw combining the adjustable screw and the push bar.

With such a structure, as the solenoid operated device is energized, a magnetic force is produced to attract the plunger with the result that the fluid pressure in the pressurized fluid chamber is lowered due to increase of volume, and the push bar retracts inwardly into the chamber. One the other hand, if the power supply to the solenoid operated device is cut off, the magnetic force produced therefrom disappears causing the coil spring to be released from a tensile force and stretched to reject the plunger outwardly. As a result, the push bar is forced to extend outwardly due to increase of fluid pressure caused by decreased volume of the pressurized fluid chamber. Besides, a spacer having an adjustable aperture thereon is provided between the pressurized fluid chamber and the push bar so as to adjust the fluid pressure for alleviating and smoothening movement of the push bar.

BRIEF DESCRIPTION OF THE DRAWINGS

The drawings disclosed an illustrative embodiment of the present invention which serves to exemplify the various advantages and objects hereof, and are as follows.

DETAILED DESCRIPTION OF THE PREFERRED EMBODIMENT

Figure 1:
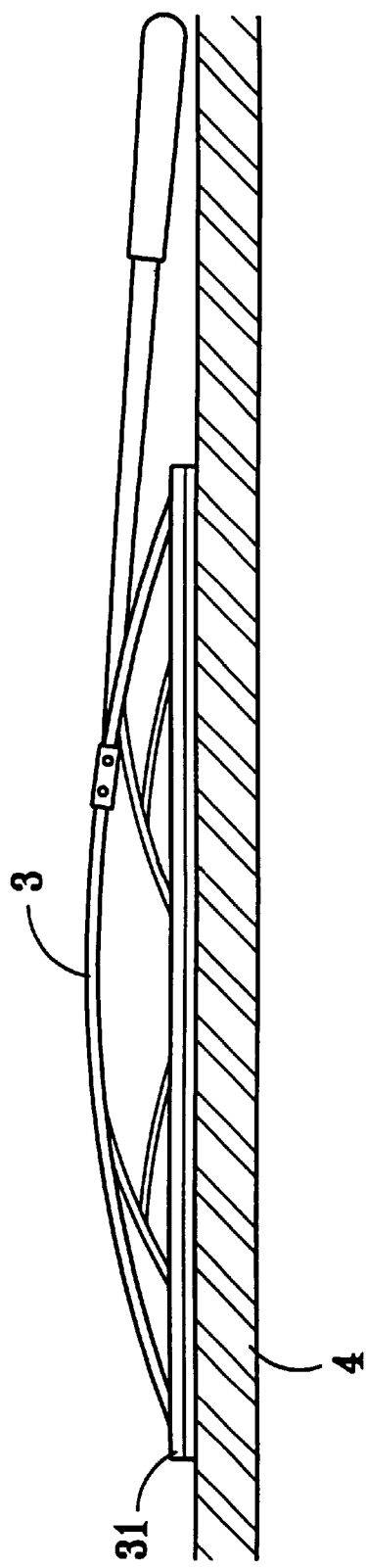
FIG. 1 is a schematic view of a conventional windshield wiper which is not equipping with the protector of the present invention.

FIG. 1 shows a conventional windshield wiper whose shortcomings is described above and need not to be repeated hereinafter.

Figure 2:
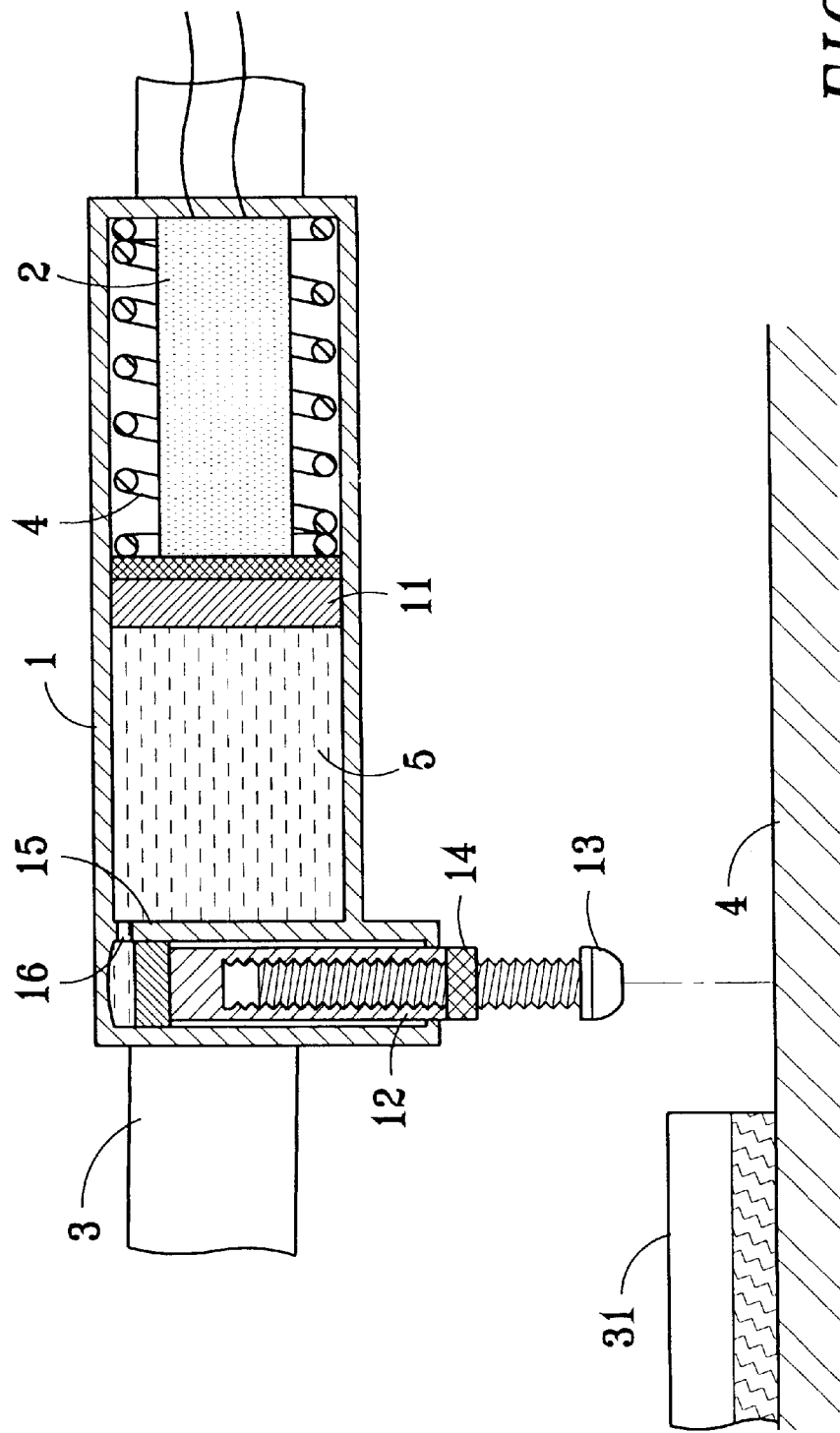
FIG. 2 is a cross sectional view showing the state of the windshield wiper protector of the present invention at the beginning of operation.
Figure 3:
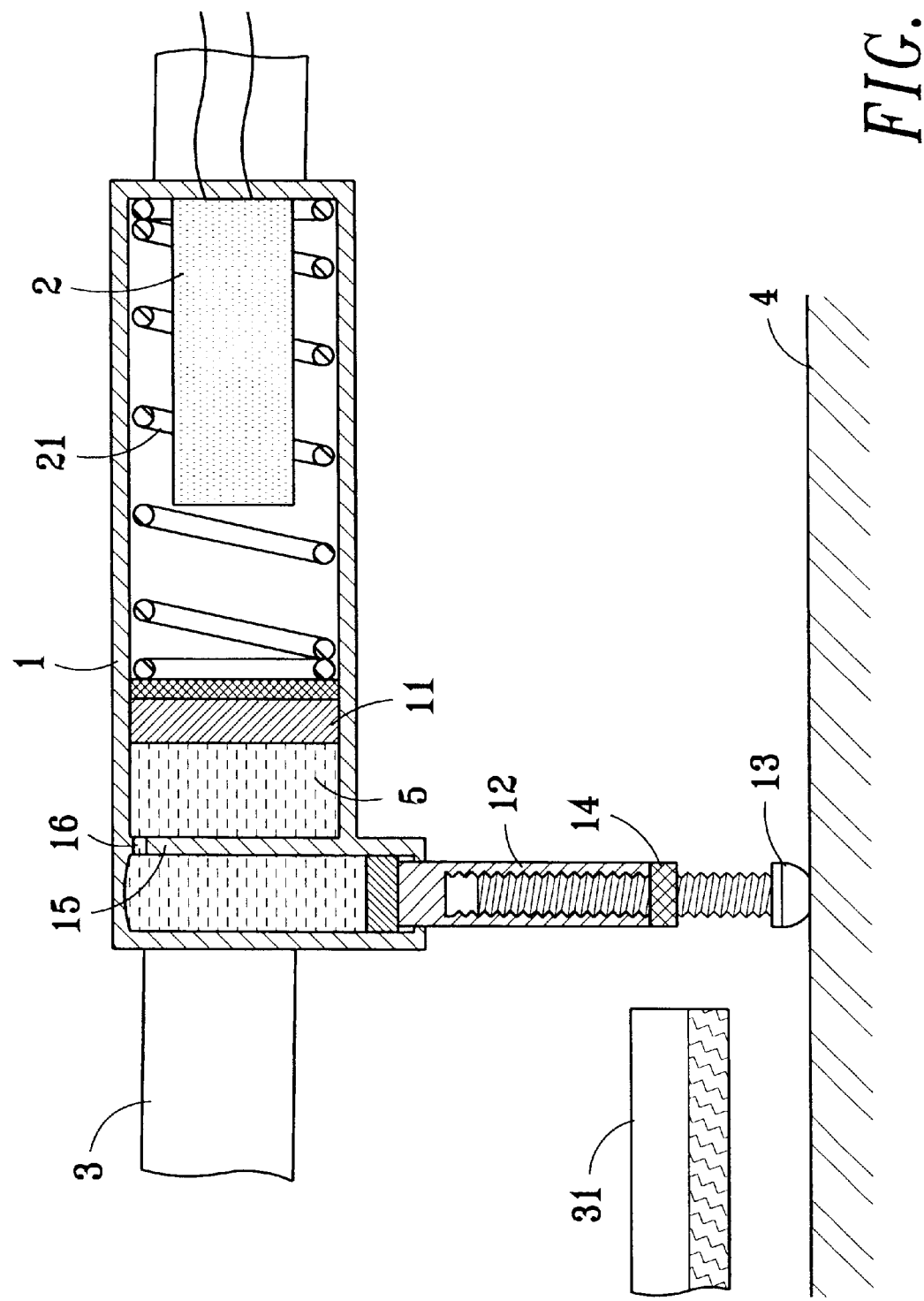
FIG. 3 is a cross sectional view showing the state of the windshield wiper protector of the present invention before operation.

FIGS. 2 and 3 show respectively cross sectional view of the windshield wiper protector according to the present invention at the beginning of operation and before operation. The protector comprises a pressurized fluid container 1 with a plunger 11 therein which is able to reciprocate in the container 1. A solenoid operated device 2 is installed in the container 1 adjacent to one side of the plunger 11. The solenoid operated device 2 can be energized/de-energized to produce/loose a magnetic attracting force so as to make the plunger perform reciprocating motion. A coil spring 21 is connected to the plunger 11 at the same side of the solenoid operated device 2 for controlling motion of the plunger 11. A pressurized fluid chamber 5 is formed adjacent to the plunger 11, while a push bar 12 is connected to the pressurized fluid chamber 5 at the side opposite to the plunger 11. The extension/retraction motion of the push bar 12 is controlled by variation of fluid pressure produced in the chamber 5. An adjustable screw 13 is screw engaged to an extended end of the push bar 12. The adjustable screw 13 which being able to extend/retract along longitudinal direction of the push bar 12 is screw combined with the push bar 12 using a fixing nut 14.

Referring again to FIG. 2, when the solenoid operated device 2 is energized, a magnetic force produced therefrom attracts the plunger 11 to move towards the device 2, and the coil spring 21 is compressed at the same time. The fluid pressure in the chamber 5 is lowered due to increase of volume of the chamber 5 by displacement of the plunger 11 with the result that the push bar 12 is retracted into the chamber 5 together with the adjustable screw 13.

Referring to FIG. 3, when the solenoid operated device 2 is de-energized, the magnetic force produced therefrom disappears causing the soil spring 21 is released from the tensile force and stretched to reject the plunger 11 together with the adjustable screw 13 out of the chamber 5 whose fluid pressure is increase with reduced volume.

Meanwhile, a spacer 15 having an aperture 16 thereon is provided between the chamber 5 and the push bar 12 so as to adjust the fluid pressure thereby alleviating and smoothening movement of the push bar 12.

Figure 4:
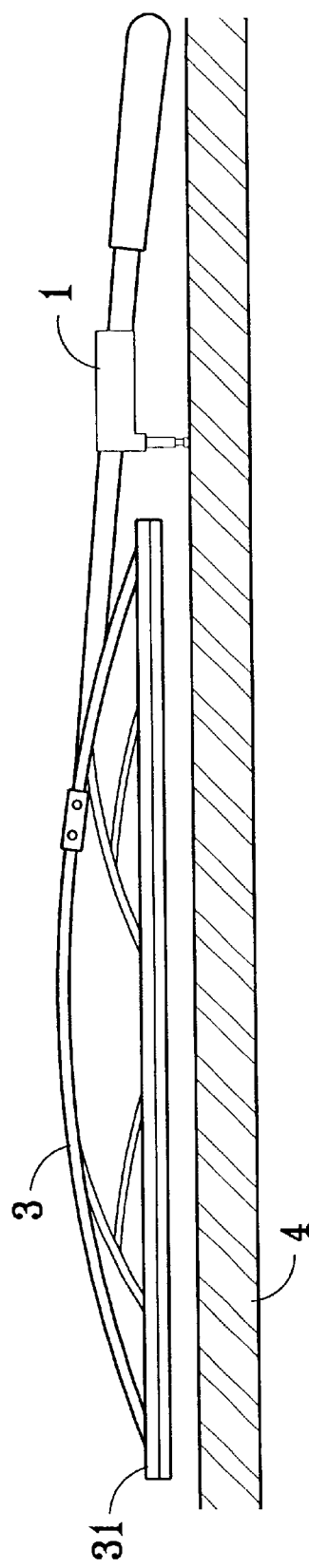
FIG. 4 is a schematic view showing the state of a windshield wiper when the windshield wiper protector of the present invention is at service.
Figure 5:
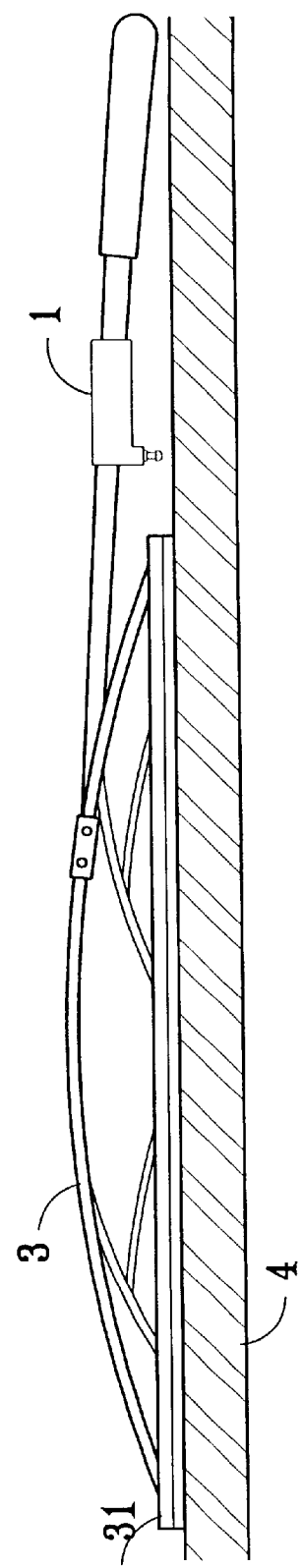
FIG. 5 is a schematic view showing the state of a windshield wiper when the windshield wiper protector of the present invention is ended its service.

Referring to FIGS. 4 and 5, when in actual operation, the solenoid operated device 2 is connected to the wiper driving motor in the automobile for power supply, and the wiper protector unit of the present invention is settled on a wiper arm 3. In a normal state the push bar 12 is extended, which means that the wiper blade 31 is sustained up by the wiper protector and separated form the windshield glass 4. If the clearance between the wiper blade 31 and the windshield glass 4 is insufficient, the fixing nut 14 may be loosened to take off the adjustable screw 13 to adjust the clearance therebetween, and then tighten again the fixing nut 14. By so, before starting the automobile, the driver may clean up dusts or oil stains stuck on the windshield glass easily by means of a brush, a piece of cloth or the like.

When the wiper is started to operate, the push bar 12 retracts into the chamber 5 by the magnetic force of the solenoid operated device 2 so as to bring down the wiper blade 31 and make a perfect contact with the windshield glass 4.

When the power supply to the wiper is off, the push bar 12 is extended out by the elastic force of coil spring 11 so that the wiper blade 31 is sustained up and separated from the windshield glass 4 thereby a perfect protection is provided.

If the wiper blade is too long, a plurality of protectors can be added on the wiper arm 3 to assure complete separation of the wiper from the windshield glass.

Here, the advantages of the present invention can be enumerated as follows:

1. It can provide quick and effective protection for windshield wiper without need of any manual handling.
2. It can effectively protect a windshield glass from abrasion by dusts and oil stains on the glass during operation of a wiper.
3. It can prolong the lifetime, assure quality, and save frequent replacement cost of a windshield wiper.
4. It is convenient to install and maintain.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A windshield wiper protector mounted to a windshield wiper assembly to lift a wiper blade from a windshield, said protector, comprising a pressurized fluid container, a plunger installed in said pressurized fluid container, a solenoid operated device provided at one side of said plunger in said pressurized fluid container, a coil spring connected to said plunger at the same side of said solenoid operated device, while the other side of said plunger being adjacent to a pressurized fluid chamber, a push bar connected to said plunger at the opposite side of said pressurized fluid chamber, and an adjustable screw combined to an extended end of said push bar such that said adjustable screw being able to extend or retract, a fixing nut for screw combining said adjustable screw and said push bar, with such a structure, as said solenoid operated device is energized, a magnetic force is produced to attract said plunger with the result that the fluid pressure in the pressurized fluid chamber is lowered due to increase of volume, and said push bar retracts inwardly into said chamber, on the other hand, if said solenoid operated device is de-energized, the magnetic force produced therefrom disappears causing said coil spring to be released from a tensile force and stretched to reject said plunger outwardly, as a result, said push bar is forced to extend outwardly due to increase of fluid pressure caused by decreased volume of said pressurized fluid chamber.

2. The windshield wiper protector of claim 1, wherein a spacer having an aperture thereon is provided between said pressurized fluid chamber and said push bar so as to adjust the fluid pressure thereby alleviating and smoothening movement of said push bar.

* * * * *